3,242,044
INSECT GROWTH AND REPRODUCTION CONTROL
Harold G. Simkover, Modesto, Calif., assignor to Shell Oil Company, New York, N.Y., a corporation of Delaware
No Drawing. Filed July 22, 1963, Ser. No. 296,436
12 Claims. (Cl. 167—33)

This application is a continuation-in-part of my copending application Serial No. 160,917, filed December 20, 1961 and now abandoned.

This invention relates to a method for controlling the growth and reproduction processes of insects, and thereby effecting control of those insects.

It has been found that 2-imidazolidinone and its N-functional derivatives have a profound and unique effect upon the development of insects, for when a developing insect is subjected to one of this kind of compound, at one point or another the development is arrested, the insects ceases to develop, and dies. From the available evidence, it appears that such a 2-imidazolidinone compound interferes with growth processes in developing insects which involve differentiation of tissue; the 2-imidazolidinone compound may interfere directly with the tissue differentiation, or it may inhibit hormones which effect and control tissue differentiation, or both. It will be appreciated that the growth processes of insects—those of all animals for that matter—are extremely complex, and have not been completely elucidated, and are not completely understood. It is therefore not possible at this time to say with certainty just what aspect or aspects of the growth process or processes is or are affected by the 2-imidazolidinone compounds. That such compounds do affect the vital processes of developing insects, and that they do arrest the development of the insects, has been clearly shown, however, by the experimental work performed to date. Thus, it has been found that when larvae of the vinegar fly (*Drosophila melanogaster*), common housefly (*Musca domestica*) and stable fly (*Stomoxys calcitrans*) are fed on media containing an effective amount of a 2-imidazolidinone compound, the larvae pass into the pupal stage normally, but no adults emerge from the pupae, the insect apparently dying at some time during its life as a pupa. It also has been found that when an effective amount of a 2-imidazolidinone compound as herein described is present in the food that they eat, the larvae and nymphs of such insects as the large milkweed bug (*Oncopeltus fasciatus*), the German cockroach (*Blattella germanica*), the corn earworm (*Heliothis zea*) and the Western spotted cucumber beetle (*Diabrotica undecimpunctata undecimpunctata*), fail to further develop normally—they fail to pass from one instar to another (they fail to molt) and/or they fail to pupate and/or fail to transform into adult insects. Mosquito (*Anopheles albimanus*) larve failed to advance from one instar to the next and fourth instar larvae did not pupate, when placed in water containing an effective amount of the compound, and even death of the larvae occurred in some instances. Further, when adult houseflies were fed on a medium containing an effective amount of a 2-imidazolidinone compound, as herein defined, the females failed to lay eggs, and when adult (and last instar) large milkweed bugs were fed on such a medium, the females laid eggs, but they failed to hatch. When adult confused flour bettles (*Tribolium confusum*) were fed with a flour containing an effective amount of a 2-imidazolidinone compound, as herein defined, a marked reduction in the bettle population—adults, larvae and pupae—resulted. In all of these experiments, the 2-imidazolidinone compound did not appear to be toxic to the adult of the species—only the immature insect is affected, albeit at apparently different stages of its development. The apparent difference in the way in which the chemicals affect the insects are believed to result only from the different sequences of growth processes involved in the development of the different species of insects. It is believed that in all cases the chemicals are affecting the same kinds of growth process (tissue differentiation) and/or are inhibiting the effect of the same hormone, whether the growth process and/or hormone effect is taking place in the development of a viable sperm, a viable egg, in the very early development of the fertilized egg, during or immediately preceding or following a molt, or during metamorphosis. In the case of the housefly, for example, it has been found that a 2-imidazolidinone compound has no apparent effect upon an adult male fly—it is the female that is prevented from laying eggs. In the case of the large milkweed bug, however, both male and female were sterilized by the 2-imidazolidinone compound. The difference is believed to lie in the fact that in the case of the housefly, spermatogenesis has occurred in the male by the time it has issued from the pupa, so that the 2-imidazolidinone has no affect on the already viable sperm; only the female's capability to produce viable eggs is affected, whereas in the case of the large milkweed bug, spermatogenesis in the male occurs only after several days following emergence of the adult, so that the 2-imidazolidinone compound prevented production of viable sperm in the male, as well as preventing production of viable eggs by the female.

It has been found, further, that the 2-imidazolidinone compounds herein defined are sufficiently stable that they will pass through the gastrointestinal tracts of mammals and birds and their presence in the excreta of the mammals and birds affects the developmental growth processes of insects which feed upon and/or grow in the excreta.

Experiments performed to date have shown that 2-imidazolidinone compounds as herein defined are essentially non-toxic to mammals, and do not affect reproductive and growth processes in mammals and birds. This is not inconsistent with the effects of these compounds upon insects, for it is well established that growth processes, in particular hormonal effects, are quite different in insects as compared to mammals and birds.

These discoveries provide a method for controlling insects, which method comprises subjecting insects to the action of 2-imidazolidinone or an N-functional derivative thereof. In one subgeneric aspect, the method comprises providing in the food and/or water to be consumed by an insect an amount of 2-imidazolidinone, or an N-derivative thereof, sufficient to adversely affect developmental growth and reproductive processes of the insect. In another subgeneric aspect, the method comprises providing in the food and/or water to be consumed by adult insects 2-imidazolidinone, or an N-functional derivative thereof, in an amount sufficient to sterilize the adult insects. In another subgeneric aspect, the method comprises providing in the food and/or water to be consumed by an immature insect 2-imidazolidinone, or an N-functional derivative thereof, in an amount sufficient to prevent maturation of said immature insect. In yet another subgeneric aspect, the method comprises providing in the aquatic medium in which an immature insect dwells an amount of 2-imidazolidinone, or an N-functional derivative theretof, sufficient to prevent maturation of said immature insect. In still another subgeneric aspect, the invention comprises the method for controlling insects which employ as growth media—i.e., which feed upon and/or dwell in—the excreta of mammals and birds, which comprises providing in the feed and/or water consumed by the animals a dosage of 2-imidazolidinone or a N-functional derivative thereof sufficient to provide in the excreta of the animals an effective amount of the 2-imidazolidinone compound sufficient to adversely affect the growth and reproductive processes of insects which employ the excreta as growth media, especially to prevent maturation of immature insects feeding upon and/or dwelling in the excreta.

As used herein, the term "N-functional derivatives" denotes those derivatives of 2-imidazolidinone in which one or both of the nitrogen atoms is bonded to a carbon atom of an organic group, that carbon atom also being bonded to an electronegative group, this configuration rendering the carbon-to-nitrogen bond labile. In terms of structural formula, the 2-imidazolidinone compounds contemplated by this invention may be represented by the formula:

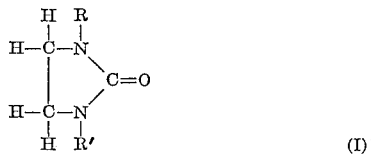

(I)

wherein R and R' each independently represents hydrogen or a functional group of the class consisting of alpha-hydroxyalkyl, alpha-alkoxyalkyl, alpha-alkylthioalkyl, alkanoyloxyalkyl (alkyl-C(O)—O-alkyl-), amino ($NH_2$—), monoalkylamino, dialkylamino, alkanoyl (alkyl-C(O)—) and alkoxycarbonyl (alkyl-O—C(O)—) of from 1 to 6 carbon atoms, morpholino, heterocyclic amino containing one nitrogen and from four to five carbon atoms, and N-(2-imidazolidinone)alkyl and N-(2-imidazolidinone) alkyloxyalkyl.

The suitable organic groups R and R' also can be represented by the formula:

wherein Z is the electronegative group, as indicated above, the character of $R^a$ and $R^b$ being indicated hereinafter.

An N-(2-imidazolidinone) group can act as the electronegative group, so that a 2-imidazolidinone bonded from one nitrogen atom thereof by a nitrogen-to-carbon bond to a nitrogen atom of another 2-imidazolidinone or N-functional derivative thereof also has been found to be suitable for the purposes of this invention. This type of functional group can be represented by the formula

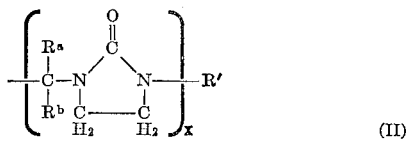

(II)

wherein $x$ is an integer from 1 to 3, $R^a$ and $R^b$ each independently represents hydrogen or alkyl from 1 to 6 carbon atoms and the other symbols have the respective meanings already given herein. In this case, $R^a$ and $R^b$ preferably are hydrogen or alkyl or from one to 3 carbon atoms, most preferred of this type appearing to be those in which both $R^a$ and $R^b$ are hydrogen (readily prepared by reacting 2-imidazolidinone with formaldehyde under acidic conditions) and those in which one of $R^a$ and $R^b$ is hydrogen and the other is alkyl of from one to 3 carbon atoms (readily prepared by reaction of 2-imidazolidinone and lower alkanals other than formaldehyde), R' preferably being hydrogen or alpha-hydroxyalkyl of 1 to 6 carbon atoms still more preferably containing not more than 3 carbon atoms.

When 2-imidazolidinone is reacted with formaldehyde under alkaline conditions, imidazolidinone rings are linked together via oxydimethylene (—$CH_2$—O—$CH_2$—) moieties. These imidazolidinones and corresponding imidazolidinones prepared by reaction of 2-imidazolidinones with other lower alkanals also are suitable in the method of the invention, with the functional group being represented by the formula

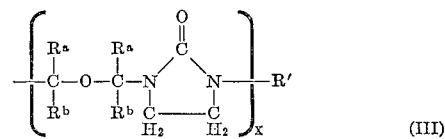

(III)

In more generic terms, these poly-imidazolidinones (II) and (III) may be represented by the formula

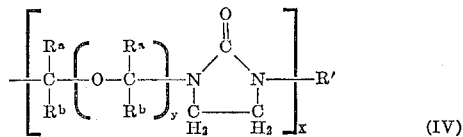

(IV)

wherein $y=0$ or 1.

Referring to Formula I, designating such functional groups is R', then R preferably represents hydrogen or alpha-hydroxyalkyl of from 1 to 3 carbon atoms.

Typical examples of the suitable functional derivatives of 2-imidazolidinone include the following as well as others described in the working examples hereinafter:

1,3-bis(ethoxymethyl)-2-imidazolidinone
1-ethoxymethyl-2-imidazolidinone
1,3-bis(dimethylamino)-2-imidazolidinone
1,3-bis(1-methoxybutyl)-2-imidazolidinone
1,3-bis(butyryloxymethyl)-2-imidazolidinone
1,3-bis(methylthiomethyl)-2-imidazolidinone
1,3-bis(acetoxymethyl)-2-imidazolidinone
1,3-bis(1-(2-methoxyethoxy)ethyl)-2-imidazolidinone
1,3-bis(morpholinomethyl)-2-imidazolidinone
1,3-bis(1-hydroxybutyl)-2-imidazolidinone
Methyl 2-oxo-1-imidazolidine carboxylate The available evidence indicates that the simplest of the 2-imidazolidinone compounds are generally the most effective; consequently, 2-imidazolidinone and its simplest mono- and di-N-functional derivatives are preferred. The preferred derivatives thus are those wherein R and/or R' is or are the alpha-hydroxyalkyl, alkanoyl, alkoxymethyl groups, of 1 to 4 carbon atoms or those functional groups represented by Formula IV wherein $x$ is 1 or 2, Y is 0 or 1, and $R^a$ and $R^b$ are hydrogen or alkyl of from one to 4 carbon atoms with R' being hydrogen or alpha-hydroxyalkyl of from 1 to 4 carbon atoms.

This is not to say, however, that more complex N-derivatives of 2-imidazolidinone are not to be preferred in some cases, for the activity and effectiveness of the 2-imidazolidinone derivatives with respect to insects will differ from species to species of the derivatives and from species to species of insects. Further, the physical properties, chemical stability, and other characteristics required of the 2-imidazolidinone compound in a given situation must be taken into consideration when choosing the 2-imidazolidinone compound to be used in that situation.

2-imidazolidinone is a well-known compound, as are its derivatives, including its N-functional derivatives. A summary of the chemistry of these compounds, and methods for their preparation are set out in Hofmann. "Imidazole and its Derivatives," Interscience, 1953, part I, pages 226–245 and references cited therein, and at pages 376–378, and references cited therein. The manner in which N-functional derivatives of 2-imidazolidinone can be prepared is illustrated in the following examples which show preparation of typical species of the N-functional derivatives of 2-imidazolidinone.

EXAMPLE I

A mixture of 17.2 grams (0.2 mole) of 2-imidazolidinone and 19 milliliters (0.2 mole) of acetic anhydride was heated at 65° C. for 1 hour and then at 90° C. for 1 hour. After being cooled to room temperature, the mixture was filtered and the crude solid product was recrystallized twice from chloroform to give 10 grams (39%) of 1-acetyl-2-imidazolidinone, melting at: 188–9° C.

*Analysis.*—Calculated for $C_5H_8N_2O_2$: Percent by weight carbon: 46.9; found: 46.4; percent by weight hydrogen: 6.3; found: 6.4; percent by weight nitrogen: 21.9; found: 21.4.

EXAMPLE II

A mixture of 17.2 grams (0.2 mole) of 2-imidazolidinone and 100 milliliters (1 mole) of acetic anhydride containing 2 drops of concentrated sulfuric acid was heated at 110–125° C. for 3 hours. Concentration of the resulting solution under vacuum and recrystallization of the residual solid from carbon tetrachloride gave 14 grams (41%) 1,3-diacetyl-2-imidazolidinone, melting at 129–130° C.

*Analysis.*—Calculated for $C_7H_{10}N_2O_3$: Percent by weight carbon: 49.4; found: 50.4; percent by weight hydrogen: 5.9; found: 6.2; percent by weight nitrogen: 16.5; found: 16.1.

EXAMPLE III

A slurry of 21 grams (0.7 mole) of paraformaldehyde and 0.1 gram of sodium hydroxide in 25 milliliters of methanol was added to a solution of 28 grams (0.33 mole) of 2-imidazolidinone in 25 milliliters of methanol over a period of 20 minutes at 50° C. The mixture was heated another hour at 50° C., was cooled to −20° C., and the solid product was separated. Recrystallization of this crude product from methanol gave 27 grams (56%) of 1,3-bis(hydroxymethyl)-2-imidazolidinone, melting at: 101–103° C.

*Analysis.*—Calculated for $C_5H_{10}N_2O_3$: Percent by weight carbon: 41.1; found: 41.1; percent by weight hydrogen: 6.8; found: 7.4.

EXAMPLE IV

A solution of 21 grams (0.7 mole) of paraformaldehyde and 0.15 gram of sodium hydroxide in 50 milliliters of methanol was added rapidly to a solution of 26 grams (0.3 mole) of 2-imidazolidinone in 50 milliliters of methanol at 40° C. The solution was heated at 50° C. for one hour, was cooled to 20° C., and then a solution of 1 milliliter of concentrated hydrochloric acid in 4 milliliters of methanol was added to it. After one hour at room temperature the solution was neutralized with sodium methoxide and distilled to give 31 grams (60%) of 1,3-bis(methoxymethyl) - 2 - imidazolidinone, boiling at 98–100° C. (1.5 Torr).

*Analysis.*—Calculated for $C_7H_{14}N_2O_3$: Percent by weight nitrogen: 16.1; found: 16.2.

EXAMPLE V

A solution of 26 grams of 2-imidazolidinone and 8 grams of 37% formalin in 50 milliliters of water was prepared, and one drop of 50% formic acid was added. A mildly exothermic reaction took place, the temperature reaching 40° after two hours. The mixture was then heated at 80° for one hour, and evaporated under reduced pressure, and the product was recrystallized from methanol. The yield was 8 grams, of 1,1′-methylene bis-2-imidazolidinone melting point: 196–7° C., a white, crystalline material soluble in water and methanol but insoluble in other common organic solvents.

*Analysis.*—Calculated for $C_7H_{12}N_4O_2$: Percent by weight nitrogen: 30.4; found: N=30.4.

EXAMPLE VI

A mixture of 26 grams of 2-imidazolidinone and 13 grams of 37% formalin was treated with 4 milliliters of 50% formic acid and the reaction mixture was heated to reflux for one hour. Water was then removed under reduced pressure leaving a white, pasty residue. The product was dissolved in methanol and reprecipitated by chilling. Eight grams of 1,1′-((methylene bis(2-oxo-1,3-imidazolidinediyl))-dimethylene)bis-2 - imidazolidinone, a white solid melting at 238–40° C. was obtained; it was soluble in water, but insoluble in common organic solvents.

*Analysis.*—Calculated for $C_{15}H_{24}N_8O_4$: Percent by weight carbon: 47.3; found: 46.7; percent by weight nitrogen: 29.4; found: 28.6.

EXAMPLE VIA

A solution of 40 grams of 2-imidazolidinone and 77 grams of 37% aqueous formaldehyde was brought to pH 10 with 20% sodium hydroxide solution and heated at 60° for 0.5 hour. The cooled solution was then adjusted to pH 7.5 with 10% hydrochloric acid, heated at 90° for 1.25 hours, and finally evaporated under vacuum to leave 50 grams (81%) of 2-imidazolidinone, 1,1′-oxydimethylenebis((3-hydroxymethyl)-2).

*Analysis.*—Calculated for $C_{10}H_{18}N_4O_5$: Percent by weight: C, 43.8; N, 20.4; found: C, 44.3; N, 19.9.

EXAMPLE VII 26 grams of 2-imidazolidinone was added to 50 milliliters of water, followed by 12 grams of acetaldehyde. An exothermic reaction took place and after approximately five minutes the mixture became a clear solution and the temperature had risen to about 50°. The mixture was allowed to cool and was evaporated under reduced pressure to yield 7 grams of 3-(1-hydroxyethyl)-1,1′-ethylidene bis-2-imidazolidinone a water-soluble, solid melting at 158–162° C.

*Analysis.*—Calculated for $C_{10}H_{18}N_4O_3$: Percent by weight nitrogen: 23.2; found: 23.8.

The identity of the product was confirmed by its infrared spectrum.

From the available evidence, 2-imidazolidinone and/or its N-functional derivatives affect the vital processes involved in the development of insects, generally. By "insects" is meant not only the members of the class Insecta, but also related to similar organisms belonging to allied classes of arthropods and including mites, ticks, spiders, wood lice, and the like.

The 2-imidazolidinones and the N-functional derivatives thereof can be employed for controlling the developmental growth processes of insects by introducing one or more of those compounds into the food and/or water which the insects consume, and/or into a medium in which the insect is developing. Thus, adult insects can be sterilized by introducing one or more of the 2-imidazolidinone compounds into their food or water before there has occurred in the insects generation of sperm (in the males) or formation and/or deposition of viable eggs (in the female). The development processes of immature insects can be interrupted by introducing one or more of the 2-imidazolidinone compounds into their food and/or water, or into their environment or medium in which they are developing—in the case of aquatic insect forms, introducing the compound(s) into their aquatic environment; in the case of insect forms that develop in excreta from mammals, introducing the compound(s) into the excreta. The 2-imidazolidinone compound(s) can be introduced directly into the food and/or water to be consumed by the insect, or into the medium in which it is growing, as by spraying, dusting or simply mixing the compound(s) with the food, water and/or medium. In addition, or alternatively, the 2-imidazolidinone compound(s) can be introduced into the medium in which the insect forms are developing, such as the excreta from mammals and birds, by including the compound(s) in the food and/or water which the mammals and birds consume.

The 2-imidazolidinone compounds are generally crystalline solids at ordinary room and field temperatures, and are substantially soluble in water. Consequently, they can in many cases be used neat, in the form of powder or dust, which is brought into the insects' food.

Thus, the 2-imidazolidinone compounds can be dusted or sprinkled onto garbage or other refuse, on the droppings of livestock and other animals, on plants attacked by chewing insects, to disseminate the compounds on and/or in the insects' food or solid development media; or the compounds can be dusted or sprinkled on ponds, streams and other sources of water which insects consume or in which they develop. If desired, the imidazolidinone compounds can be formulated as dusts or granules, employing conventional solid carriers and extenders, and including adjuvants such as stickers. Alternatively, the 2-imidazolidinone compounds can be dissolved in water and the resulting solution used instead of the powdered materials. The liquid formulations of these active materials can include such adjuvants as the conventional stickers, spreading agents, wetting agents, and the like. If desired, the active materials can be disseminated in the form of aerosols, as by dispersing them by means of a compressed gas.

2-imidazolidinone and its N-functional derivatives have been found to be essentially nontoxic to mammals and birds at the dosages required to effectively control the developmental growth processes of insects which feed upon and/or develop in excreta from those mammals and birds; furthermore, these 2-imidazolidinone compounds are not known to have any adverse effect upon mammals and birds when used at those dosages. In addition to effecting control of insects which feed upon and/or develop in excreta from the mammals and birds the 2-imidazolidinone compounds also will effect control of parasitic insects present in the gastrointestinal tract of the mammals and birds by affecting the developmental growth processes of those insects. 2-imidazolidinone and its N-functional derivatives apparently are palatable to mammals and birds, and can readily be introduced into the animals in the feed and/or water consumed by them. By introducing the compounds into the animal feed and/or water, it is possible to control both internal parasites of the animal and also insects which feed on and/or develop in the animal's droppings and/or urine, thus providing control of insects such as houseflies and stable flies without the necessity for spraying the excreta.

The concentration of the 2-imidazolidinone compound in the insect food, water or growth medium required to interfere with development growth process of the insect as might be expected varies from species to species of the 2-imidazolidinone compounds and from species to species of the insects involved. In general, however, a concentration of at least about 20 parts of the 2-imidazolidinone per million parts (by weight) of the food, water or growth medium is necessary, and usually it will be found desirable to employ somewhat larger concentrations, for example, 50 parts per million or more, on the same basis. It generally will be found that concentrations in excess of about 2000 parts per million will give little advantage over lesser concentrations and are undesirable because of waste of the active material. In most cases, dosages of from about 50 to about 750 parts per million will be found effective, yet economical.

When the effective dosage of the imidazolidinone compound in an animal's feces is to be attained by feeding the compound to the animal, due allowance must be made for the fact that some of the imidazolidinone compound inevitably is lost in its passage through the animal. In the case of the manogastric animals—dogs, cats, mice, horses, pigs and the like—the amount of the imidazolidinone compound lost during passage through the animal is not great, relatively, and in general the dosage of the compound to be fed the animal will be from about one and one-half to three times the dosage required in the animal excreta. In ruminants, considerably more of the imidazolidinone compounds can be expected to be lost in passage through the animal—probably because of absorption in the rumen, because of attack by microorganisms in the rumen and because of attack by gastric juices throughout the gastrointestinal tract of the animal. If the imidazolidinone compound is used neat, it is generally necessary to provide in the animal feed and/or water a dosage of from about four to about six times the dosage required in the animal excreta. Alternatively, the imidazolidinone compound may be fed to the animal in a formula in which it is "protected" from the effects of gastric juice, microorganisms and absorption by the animal. Thus, the imidazolidinone compound may be micro-encapsulated, in the form of "spansules," impregnated in resins, impregnated in controlled solubility starches, clays and the like, or in the form of any other "slow release" formulations known to and commonly used in medical and veterinary practice.

The effects of 2-imidazolidinone and its functional derivatives upon insects are demonstrated by the following experiments and their results.

EXAMPLE VIII

*Drosophila melanogaster* were allowed to feed upon a standard rearing medium to which had been added 50 or 100 parts per million of the weight of the medium of 2-imidazolidinone. The adults laid eggs normally and these hatched normally into larvae. The larvae showed no evidence of inhibition of growth and normal numbers of pupae were formed. However, no adults emerged, even though the pupae were held for several days beyond the normal expected date of adult emergence. Examination of the pupae showed that metamorphosis had only partially occurred, and that the pupal contents had become dessicated. *D. melanogaster* in the control test developed normally.

EXAMPLE IX

Eggs of a strain of multiple resistant houseflies (able to tolerate dieldrin and DDT), as well as eggs of a normal strain of houseflies, were deposited upon 150 gram portions of a standard ration, one portion being the standard ration alone, each of the other portions having added thereto a known amount of 2-imidazolidinone. One hundred eggs were deposited on each 150 gram portion of the ration. The eggs were allowed to hatch and the larvae to feed on the ration and to develop as they would. The following results were obtained:

*Table I*

| Dosage (Grams 2-imidazolidinone per 150 gram portion of the ration.) | Strain of flies | No. pupae (average) | Percent adult emergence (average) |
|---|---|---|---|
| 0 (untreated control) | Normal | 81 | 90 |
| 0.05 | do | 51 | 0 |
| 0.10 | do | 24 | 0 |
| 0 (untreated control) | Resistant | 47 | 87 |
| 0.05 | do | 30 | 6 |
| 0.10 | do | 2 | 0 |

EXAMPLE X 200 adult houseflies (normal strain) a few hours old were introduced into a cage and therein continuously fed with milk containing one percent by weight of 2-imidazolidinone. 200 adult houseflies (same strain) and of the same age were introduced into a cage and therein continuously fed with the same milk containing no 2-imidazolidinone. The flies were observed daily for six days, for mortality, mating and oviposition. No mortality was observed in either cage; in both cages the flies mated normally. At the end of the five day period, it was estimated that the flies in the control experiment (milk not treated) had laid 5,000–7,000 eggs, while the flies fed upon the milk containing the imidazolidinone had laid approximately 200 eggs. On the sixth day, the flies in the control experiment had laid over 10,000 eggs, while there was no further significant egg laying by the flies fed upon the treated milk. The test was repeated, using huts and introducing over 2,000 housefly pupae into each hut. In all huts mating was observed to be normal, and no appreciable mortality was noted. On the fifth day, the number of eggs laid was estimated to be: in the control, 6,000; in the test experiment, 0.

One hundred eggs from the control experiment and 100 eggs from houseflies fed 0.1% 2-imidazolidinone in milk were placed in jars of standard growth media. Normal pupae formed from the larvae hatched from the eggs from the control experiment, while none of the larvae which hatched from eggs from the test experiment formed pupae.

EXAMPLE XI

Broadbean plants were sprayed with a 1% aqueous solution of 2-imidazolidinone and a large number of corn earworm eggs were placed upon the treated plants. The larvae hatched and soon died. Then broadbean plants were sprayed with a 0.5% solution of 2-imidazolidinone and corn earworm eggs placed upon the plants. The eggs hatched and the larvae lived for about one week, with very few reaching the second instar. In another test, late third instar larvae were placed upon broadbean plants that had been spray with a 0.5% solution of 2-imidazolidinone. Within six days, many of the larvae were noted to be "half-dead"—the anterior remained green and showed some movement, while the posterior was brown and "dead." Freshly-sprayed plants were provided for the survivors. Only about 10% of the larvae were alive ten days after the initial spraying, and of the survivors, only half molted to fourth instars, and by the fifteenth day, all of these were dead.

In a further test, mature fifth instar larvae, ready to pupate, were fed upon corn kernels that had been soaked in a solution of 1% 2-imidazolidinone in water. After nine days, the larvae were examined, and it was found that but 10% had successfully pupated, the remainder being dead or moribund. In a control experiment in which larvae of the same age were fed on untreated corn, 80% of the larvae successfully pupated.

EXAMPLE XII

Mosquito (*Anopheles albimanus*) larvae grouped by instar were placed in a series of jars containing 100 parts per million by weight of 2-imidazolidinone in water. In all cases, the larvae failed to advance to the next instar, and young fourth instar larvae did not pupate. A concentration of 50 parts per million by weight of the 2-imidazolidinone in the water produced like results.

EXAMPLE XIII

Dosages as low as 0.005% (by weight) of 2-imidazolidinone given in the water to the nymphs of the large milkweed bug have been found to inhibit further development. At a dosage of 0.05% first instar nymphs fail to molt; at 0.02% they molt once, then die, while at 0.005% most succeed in molting twice but do not develop beyond the third instar. First, second, third and fourth instars were separately fed with water containing 0.05% and 0.01% by weight of 2-imidazolidinone, and death usually occurred just prior to or just after molting.

EXAMPLE XIV

Fifty adult confused flour beetles, *Tribolium confusum*, were introduced into two replicates of bran-flour-yeast media treated with 100 parts per million by weight of 2-imidazolidinone. Forty-two days later a count of the living Tribolium was made, with the following results:

Untreated control—998 adults, 700 pupae, approximately 1000 larvae.

Treated food (average of two replicates)—222 adults, 147 pupae, 30 larvae.

The 2-imidazolidinone thus effected an overall reduction in the Tribolium population of about 85%.

EXAMPLE XV

One hundred eggs of the stable fly, *Stomoxys calcitrans*, were placed on two replicates of growth media (150 grams of media per replicate) treated with 2-imidazolidinone. The following results were obtained:

Untreated control—89 pupae, 95 percent emergence of adults.

Treated media, 0.05 gram 2-imidazolidinone per 150 grams of medium—82 pupae; no adults emerged.

Treated media, 0.10 gram 2-imidazolidinone per 150 grams of medium—64 pupae; no adults emerged.

EXAMPLE XVI

Eggs of the Western spotted cucumber beetle, *Diabrotica undecimpunctata undecimpunctata*, were inoculated into vermiculite in which were growing corn and alfalfa seedlings. 2-imidazolidinone in water was applied to the vermiculite every second day. Periodically the vermiculite was sifted for larvae, which was transferred to roots of fresh plants growing in vermiculite. The results:

*Table II*

| Treatment | Number 1st and 2nd Instars | Number 3rd Instars |
|---|---|---|
| Water control | 70 | 67 |
| Water containing 0.1% of 2-imidazolidinone | 28 | 4 |

EXAMPLE XVII

Mosquito fish, *Gambusia spp.*, were subjected to water containing 1000 parts per million by weight of 2-imidazolidinone. The fish showed no ill effects 24 hours later.

EXAMPLE XVIII

Some of the experiments described in Example X indicate that 2-imidazolidinone can act to sterilize houseflies. To determine which sex of the houseflies had been rendered sterile, females which had been fed for five days upon milk containing 1% of 2-imidazolidinone were mated with males fed on untreated milk; males which had been similarly fed upon the milk containing 2-imidazolidinone were mated with females fed on untreated milk; males and females which had been fed on the milk containing the 2-imidazolidinone were mated, and as a control, males and females which had been fed on untreated milk were mated, and the results of the matings observed. In all cases, the females which had been fed upon the milk containing the 2-imidazolidinone did not oviposit, while those which had been fed only untreated milk oviposited normally, regardless of whether or not the male had been fed the milk containing the 2-imidazolidinone. The 2-imidazolidinone had affected—sterilized—only the female houseflies.

EXAMPLE XIX

Last instar large milkweed bugs were fed water containing, respectively, concentrations of 0.005, 0.01, 0.05 and 0.5 percent 2-imidazolidinone. Most became adults the following day. They mated after 4 days and females of each of the groups fed upon the differing concentrations of 2-imidazolidinone in water laid eggs within another 4–6 days. None of the eggs hatched, while in control experiments in which the bugs were fed pure water, almost complete hatching occurred. The procedure was repeated with the later batches of eggs from female bugs, with the same results.

Large milkweed bugs were subjected to tests similar to those described in Example XVIII to ascertain which sex was affected by the 2-imidazolidinone. The tests showed that both sexes were affected—were sterilized—by the 2-imidazolidinone.

EXAMPLE XX

Tests were performed to demonstrate whether 2-imidazolidinone could be fed to a mammal to control insects which breed and/or feed in the excrement of the mammal.

(A) Mice were fed water containing 1%, 0.5%, and 0.1% 2-imidazolidinone. The feces of the mice were collected two days later, and were inoculated with eggs of a normal strain of houseflies. After seven days, the feces were examined for housefly pupae; none were found. In control experiments, 96% of the housefly eggs developed into pupae.

The mice appeared unaffected by the 2-imidazolidinone (the daily dosage was approximately 3 grams of 2-imidazolidinone per kilogram of mouse body weight). Other tests have shown that the acute oral toxicity ($LD_{50}$) of 2-imidazolidinone for mice is in excess of 5 grams per kilogram of body weight.

(B) 2-imidazolidinone was administered to two-week old Leghorn chickens, in the feed of one group, and in the water of another. The droppings of the chickens on the second and fifth days after the treatment were collected and inoculated with eggs of a normal strain of houseflies. The following results were obtained:

A dosage of 500 parts per million is the equivalent of one pound of 2-imidazolidinone per ton of feed.

The 2-imidazolidinone had no apparent effect upon the chickens.

EXAMPLE XXI

A half-grown sheep was given drinking water containing 1000 parts per million by weight of 2-imidazolidinone. Fecal samples were taken at intervals, and inoculated with eggs of a normal strain of houseflies. Fresh droppings of sheep on pasture were used as controls. The percent of fly eggs reaching the pupal stage and the percentage of adult emergence from the pupae were determined and are set out on Table IV.

Table IV

| Treatment | 4th day droppings | | 7th day droppings | | 8th day droppings | |
|---|---|---|---|---|---|---|
| | Percent pupae | Percent adults | Percent pupae | Percent adults | Percent pupae | Percent adults |
| None (untreated control) | 50 | 74 | 62 | 49 | 50 | 54 |
| 2-imidazolidinone | 20 | 11 | 23 | 6 | 0 | |

EXAMPLE XXII

Derivatives of 2-imidaxolidinone were tested to determine their effect upon *Drosophila melanogaster* by the method described in Example VIII. The derivatives which were tested are set out in Table V. None of these compounds were toxic to the adult insects or to the larvae. The concentrations (parts per million by weight of the rearing medium) of the test compounds and the results are summarized on Table V.

Table V

| Compound | Concentration | Remarks |
|---|---|---|
| 1-acetyl 2-imidazolidinone | 1,000 | No adult emergence. |
| | 100 | 77% do not emerge. |
| 1,3-diacetyl 2-imidazolidinone | 1,000 | No adult emergence. |
| | 100 | 95% do not emerge. |
| 1,3-bis(hydroxymethyl)-2-imidazolidinone | 100 | No adult emergence. |
| 1,3-bis(methoxymethyl)-2-imidazolidinone | 1,000 | No adult emergence. |
| | 100 | 95% do not emerge. |
| 1,1'-methylenebis-2-imidazolidinone | 1,000 | No adult emergence. |
| | 100 | 53% do not emerge. |
| 3-(1-hydroxyethyl)-1,1'-ethylidene bis-2-imidazolidinone. | 1,000 | No adult emergence. |
| | 100 | Do. |
| 1,3-bis(1-hydroxybutyl)-2-imidazolidinone | 1,000 | No adult emergence. |
| | 100 | 98% do not emerge. |
| 1,3-bis(ethoxymethyl)-2-imidazolidinone | 1,000 | No adult emergence. |
| | 100 | 98% do not emerge. |
| 1,3-bis(1-methoxyethyl)-2-imidazolidinone | 1,000 | No adult emergence. |
| | 100 | 97% do not emerge. |
| 1,3-bis(1-methoxybutyl)-2-imidazolidinone | 1,000 | No adult emergence. |
| | 100 | 98% do not emerge. |
| 1,3-bis(acetoxymethyl)-2-imidazolidinone | 1,000 | No adult emergence. |
| | 100 | 98% do not emerge. |
| 1-propionyl-2-imidazolidinone | 1,000 | No adult emergence. |
| | 100 | |
| 1,3-dipropionyl-2-imidazolidinone | 1,000 | 97% do not emerge. |
| | 100 | 98% do not emerge. |
| 1-butyryl-3-imidazolidinone | 1,000 | No adult emergence. |
| | 100 | 99% do not emerge. |
| Methyl 2-oxo-1-imidazolidine-carboxylate | 1,000 | No adult emergence. |
| | 100 | 96% do not emerge. |
| 1,1'-oxydimethylenebis(3-(hydroxymethyl)-2-imidazolidinone). | 1,000 | No adult emergence. |
| | 100 | |

Table III

| Treatment | Concentration (parts per million by weight of the food or water) | 2-day droppings | | 5-day droppings | |
|---|---|---|---|---|---|
| | | Average number of pupae | Percent adult emergence | Average number of pupae | Percent adult emergence |
| None (untreated control) | | 33 | 85 | 45 | 73 |
| 2-imidazolidinone in feed | 250 | 17 | 35 | 38 | 30 |
| | 500 | 5 | 15 | 21 | 15 |
| | 1,000 | 0 | | 0 | |
| 2-imidazolidinone in water | 250 | 68 | 88 | 24 | 36 |
| | 500 | 2 | 0 | 1 | 0 |
| | 1,000 | 0 | | 0 | |

Other 2-imidazolidinone derivatives found to be active in this test include 1,3-bis(butoxymethyl)-2-imidazolidinone;
1,3-bis((methylthio)methyl)-2-imidazolidinone;
1,3-bis(morpholinomethyl)-2-imidazolidinone;
1,3-bis(butyryloxymethyl)-2-imidazolidinone.

I claim as my invention:

1. A method for controlling insects, which method comprises providing in at least one of the food and water to be consumed by an insect an amount up to approximately one percent of a 2-imidazolidinone compound hereinafter defined, the dosage of said compound being nontoxic to the insect but sufficient to adversely affect the developmental growth and reproduction processes of the insect, said 2-imidazolidinone compound being a member of class having the formula:

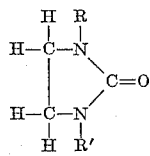

wherein R and R' each independently represents a member of the group consisting of hydrogen, alpha-hydroxyalkyl, alpha-alkoxyalkyl, alpha-alkylthioalkyl, alkanoyloxyalkyl, alkanoyl, alkoxycarbonyl, amino, monoalkylamino and dialkylamino of from 1 to 6 carbon atoms, morpholino and unsubstituted heterocyclic amino containing one nitrogen and from 4 to 5 carbon atoms.

2. A method for controlling insects, which method comprises providing in at least one of the food and water to be consumed by an insect an amount up to approximately one percent by weight of a 2-imidazolidinone compound hereinafter defined, the dosage of said compound being nontoxic to the insect but sufficient to adversely affect the developmental growth and reproduction processes of the insect, said 2-imidazolidinone compound being a member of the class having the formula:

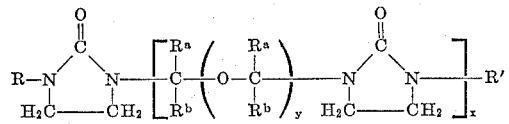

wherein $R^a$ and $R^b$ each independently represents a member of the group consisting of hydrogen and alkyl of from 1 to 6 carbon atoms, R' represents a member of the group consisting of hydrogen and alphahydroxyalkyl of from 1 to 6 carbon atoms, X is an integer from 1 to 3, y is an integer from 0 to 1, and R represents a member of the group consisting of hydrogen and alpha-hydroxyalkyl of from 1 to 6 carbon atoms.

3. A method according to claim 2 wherein $R^a$, $R^b$, R' and R each is hydrogen and y is 0.

4. A method according to claim 2 wherein $R^a$ and R each is hydrogen, $R^b$ is alkyl of from 1 to 6 carbon atoms, R' is alpha-hydroxyalkyl of from 1 to 6 carbon atoms and y is 0.

5. A method according to claim 2 wherein $R^a$ and $R^b$ each is hydrogen, R and R' each is hydroxymethyl and y is 1.

6. A method according to claim 1 wherein the 2-imidazolidinone compound is provided aquatic medium in which an immature insect is dwelling.

7. A method according to claim 2 wherein the 2-imidazolidinone compound is provided aquatic medium in which an immature insect is dwelling.

8. A method according to claim 1 wherein the 2-imidazolidinone compound is provided in at least one of the food and water to be consumed by an animal to control insects which employ as growth media the excreta of the animal.

9. A method according to claim 2 wherein the 2-imidazolidinone compound is provided in at least one of the food and water to be consume by an animal to control insects which employ as growth media the excreta of the animal.

10. A method according to claim 1 wherein the 2-imidazolidinone compound is 2-imidazolidinone.

11. A method according to claim 6 wherein the 2-imidazolidinone compound is 2-imidazolidinone.

12. A method according to claim 8 wherein the 2-imidazolidinone compound is 2-imidazolidinone.

References Cited by the Examiner

UNITED STATES PATENTS 2,727,019 12/1955 Melamed _____ 167—33 X
2,840,546 6/1958 Yost _____ 260—309.7
3,008,851 11/1961 Shimizu et al. _____ 167—33 X

OTHER REFERENCES

Smith et al.: Journal of Economic Entomology, vol. 42, No. 3, pp. 439–444, 1949.

LEWIS GOTTS, *Primary Examiner.*